(12) United States Patent
Napoles et al.

(10) Patent No.: US 7,456,793 B2
(45) Date of Patent: Nov. 25, 2008

(54) ELECTROMAGNETICALLY TRANSPARENT DECORATIVE METALLIC SURFACE

(75) Inventors: Adrian Napoles, Lake Villa, IL (US); Robert A. Kroegel, Boynton Beach, FL (US); Yiu K. Chan, Vernon Hills, IL (US); Hongwei Liu, South Elgin, IL (US)

(73) Assignee: Motorola, Inc., Schaumburg, IL (US)

( * ) Notice: Subject to any disclaimer, the term of this patent is extended or adjusted under 35 U.S.C. 154(b) by 249 days.

(21) Appl. No.: 11/165,316

(22) Filed: Jun. 23, 2005

(65) Prior Publication Data

US 2007/0008227 A1    Jan. 11, 2007

(51) Int. Cl.
*H01Q 1/24*    (2006.01)
*H01Q 1/52*    (2006.01)

(52) U.S. Cl. ............... 343/702; 343/841; 343/700 MS; 343/745; 343/822

(58) Field of Classification Search ................. 343/702, 343/841
See application file for complete search history.

(56) References Cited

U.S. PATENT DOCUMENTS

| | | | |
|---|---|---|---|
| 5,178,722 A * | 1/1993 | Hoshino | 216/20 |
| 5,855,883 A * | 1/1999 | Khandke et al. | 424/94.62 |
| 6,147,302 A * | 11/2000 | Matsuo et al. | 174/390 |
| 6,855,883 B1 * | 2/2005 | Matsui | 174/393 |
| 6,943,737 B2 * | 9/2005 | Ryken et al. | 343/700 MS |
| 2002/0122006 A1 * | 9/2002 | Crawford | 343/702 |
| 2002/0171579 A1 | 11/2002 | Artis et al. | |
| 2002/0194621 A1 * | 12/2002 | Tran et al. | 725/139 |
| 2003/0010544 A1 * | 1/2003 | Chao et al. | 178/18.01 |
| 2003/0184476 A1 * | 10/2003 | Sikina et al. | 343/700 MS |
| 2004/0036646 A1 * | 2/2004 | Suzuki et al. | 342/70 |
| 2004/0198264 A1 | 10/2004 | Saur et al. | |

FOREIGN PATENT DOCUMENTS

FR    1004622 A    4/1952
WO    2004089053 A    10/2004

* cited by examiner

*Primary Examiner*—Trinh V Dinh
(74) *Attorney, Agent, or Firm*—Hisashi D. Watanabe

(57) ABSTRACT

An internal antenna system (200) for reducing interference in a wireless communication device (100) is provided. The internal antenna system (200) comprises an antenna (202) and a housing (110). The housing is configured to reduce interference in the transmission caused by the metal surface of the housing. The housing is made of or plated with an electromagnetically transparent decorative metal (ETDM). The housing has metal islands, which are separated from each other by gaps. These gaps in the ETDM surface allow the radio frequency (RF) energy of signals transmitted by the antenna to pass through.

9 Claims, 8 Drawing Sheets

110

Free Space Total Radiated Power (dBm)

| Frequency | Baseline (no metal) | ETDM surface | Difference | Average Diff. |
|---|---|---|---|---|
| Ch 128, 824 MHz | 21.70 | 22.65 | .95 | |
| Ch 189, 836 MHz | 21.70 | 22.5 | .8 | .8 |
| Ch 251, 849 MHz | 21.74 | 22.37 | .63 | |
| Ch 512, 1850 MHz | 23.51 | 23.16 | -0.35 | |
| Ch 661, 1880 MHz | 23.57 | 22.67 | -.9 | -.7 |
| Ch 810, 1909.8 MHz | 23.04 | 22.17 | -.87 | |

FIG. 8

ELECTROMAGNETICALLY TRANSPARENT DECORATIVE METALLIC SURFACE

FIELD OF THE INVENTION

The present invention relates generally to the field of wireless communication devices. In particular, the present invention relates to a system and method for reducing the attenuation of transmission/reception signals by metallic surfaces in wireless communication devices.

BACKGROUND OF THE INVENTION

An increase in the popularity of mobile phones has resulted in an evolution in the appearance of mobile phones. Various materials have been utilized to change the appearance of mobile phones, such as the introduction of metal housings or metallic surfaces on the housings of mobile phones.

One concern with mobile phones with a metal housing or a metal surface on the housing, is that the metal surface of the housing interferes with the signals transmitted/received by the internal antenna of the mobile phone. Further, the metal surface of the housing attenuates the signals transmitted/received by the internal antenna.

BRIEF DESCRIPTION OF THE DRAWINGS

FIG. 8 is a table illustrating the difference between the free space total radiated power (FTRP) by a mobile phone having a non-metallic housing and a mobile phone having an ETDM housing, in accordance with the present invention.

DETAILED DESCRIPTION OF THE PREFERRED EMBODIMENTS

The present invention provides a system and method for reducing interference in the transmission/reception of a signal, caused by a metal housing of a wireless communication device. For one embodiment, the housing of the wireless communication device is made up of an electromagnetically transparent decorative metal (ETDM). For another embodiment, the housing has a body is made of plastic and which is plated with ETDM. The ETDM surface of the housing is etched to create a plurality of metal islands, hereinafter referred to as metal islands, on the ETDM surface. The gaps between the metal islands in the ETDM surface reduce the interference in transmission/reception of signal, caused by the metal housing.

One aspect of the present invention is an internal antenna system of a wireless communication device comprising an antenna and a housing for the antenna. The housing is a part of the metal cover of the wireless communication device. Furthermore, the housing is made up of an electromagnetically transparent decorative metal (ETDM). The housing has a plurality of metal islands that are separated from each other by gaps. The gaps between the metal islands in the ETDM surface reduce the interference in the transmission/reception of signals, caused by the housing.

Another aspect of the present invention is a wireless communication device with an internal antenna and a housing. The surface of the housing is an ETDM. Further, the housing has metal islands that are separated from each other by gaps. The gaps between the metal islands in the ETDM surface reduce interference in the transmission/reception of signals, caused by the housing.

Still another aspect of the present invention is a method for reducing the interference in a wireless communication device with an internal antenna and a housing. The metal surface of the housing is etched to create metal islands on its surface. These metal islands are separated from each other by gaps. The gaps between the metal islands in the metal surface reduce interference in the transmission/reception of signals, caused by the housing.

Figure 1:
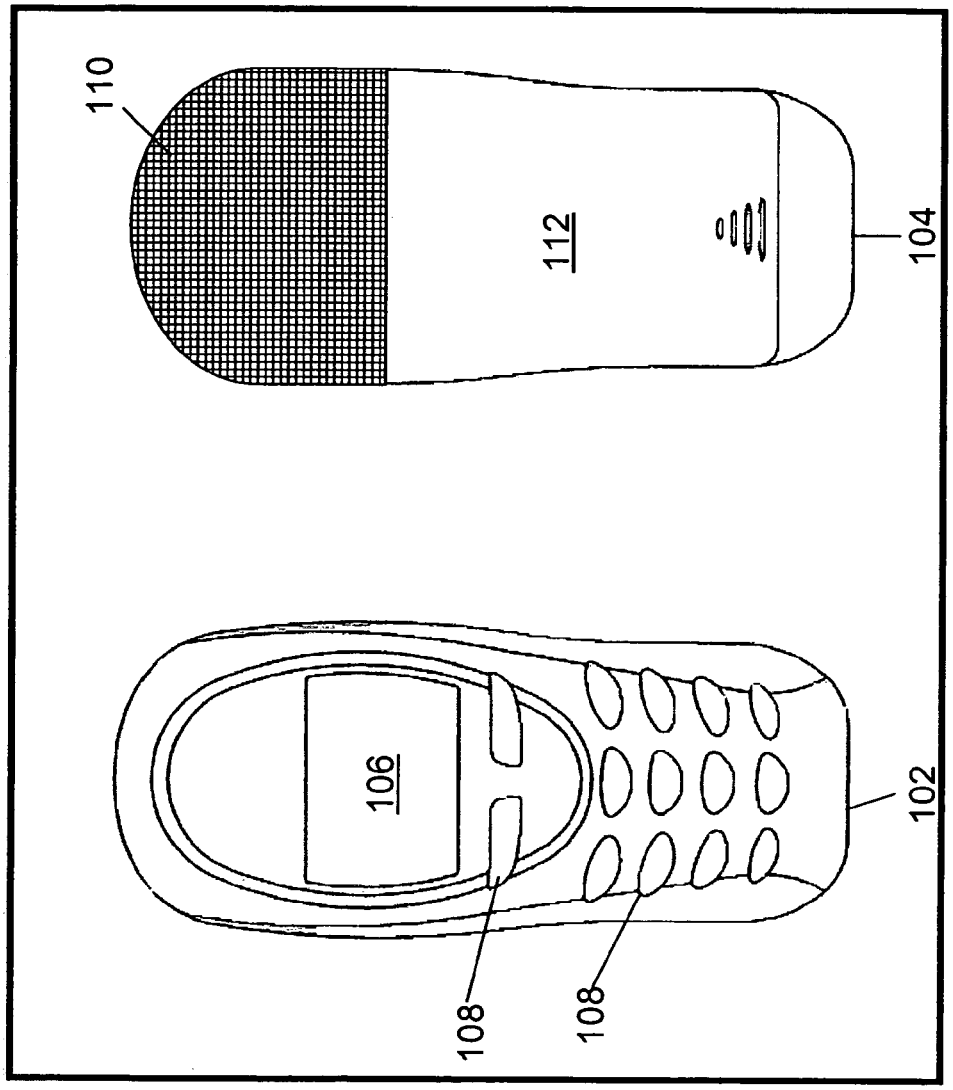
FIG. 1 illustrates an exemplary wireless communication device in accordance with the present invention.

Referring to FIG. 1, there is shown an exemplary wireless communication device 100, in accordance with the present invention. Examples of the wireless communication device 100 include a cellular phone, a mobile phone, and so forth. The wireless communication device 100 includes a front housing 102 and a back housing 104. The front housing 102 has a display screen 106 and a keypad 108. The back housing 104 includes an upper part 110 and a lower part 112.

For one embodiment, the front housing 102 is made of an electromagnetically transparent decorative metal (ETDM). The ETDM allows radio frequency (RF) energy to pass through with minimum attenuation. The display screen 106 and the keypad 108 are used by a user to interact with the wireless communication device 100. For another embodiment, the front housing 102 has a plastic body. The plastic body is further plated with the ETDM.

For one embodiment, the back housing 104 is also made of an electromagnetically transparent decorative metal (ETDM). For another embodiment, the back housing 104 has a plastic body. The plastic body is further plated with the ETDM. The upper part 110 covers an antenna of the wireless communication device 100. For one embodiment, the upper part 110 is etched to create metal islands. The metal islands are separated from each other by gaps. These gaps reduce the interference in transmission/reception of signals caused by the back housing 104. The details of creating the metal islands are explained in conjunction with FIG. 6 and FIG. 7. For another embodiment, the upper part 110 and the lower part 112 are etched, i.e., the back housing 104 of the wireless communication device 100 is etched. The upper part 110 is hereinafter referred to as a housing 110 for the antenna.

Figure 2:
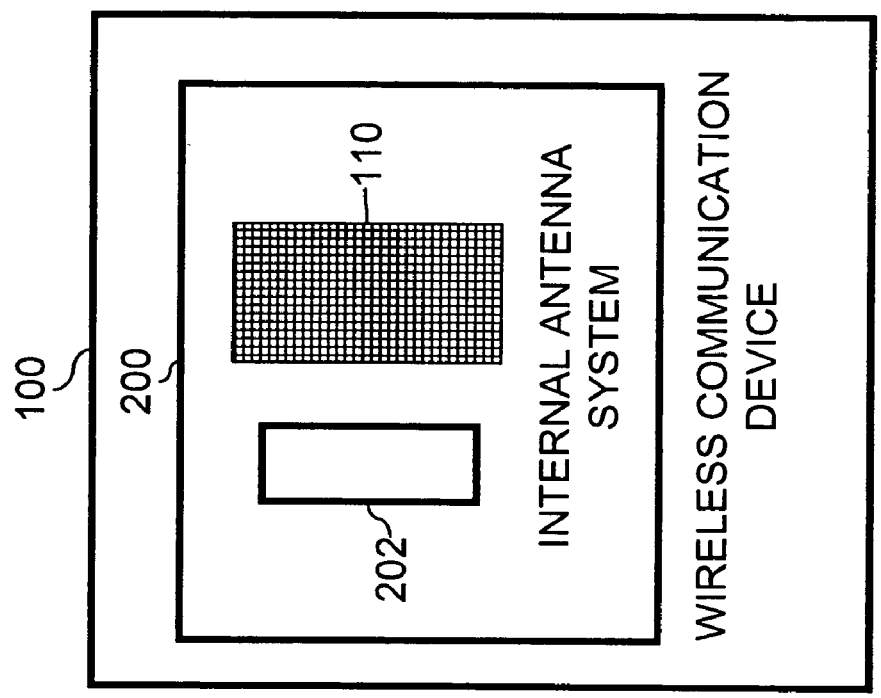
FIG. 2 illustrates a schematic side-view of an exemplary wireless communication device with an internal antenna system in accordance with the present invention.

Referring to FIG. 2, there is shown a schematic side view of the wireless communication device 100, in accordance with the present invention. The wireless communication device 100 includes an internal antenna system 200. The internal antenna system 200 includes an antenna 202 and the housing 110. The antenna 202 transmits and receives communication signals. For one embodiment, the communication signals are radio frequency signals. Examples of the antenna 202 include, but are not limited to, a planar inverted F antenna, an inverted L antenna, and a monopole antenna. The antenna 202 is a multi-band antenna, i.e., the antenna 202 can transmit and receive signals in multiple frequency bands. For an embodiment, the antenna 202 is a dual-band antenna. For example, the antenna 202 transmits and receives signals in the Digital Communication System (DCS) band (1710-1880 MHz frequencies) and the Personal Communication System (PCS) band (1850-1990 MHz frequencies).

Figure 3:
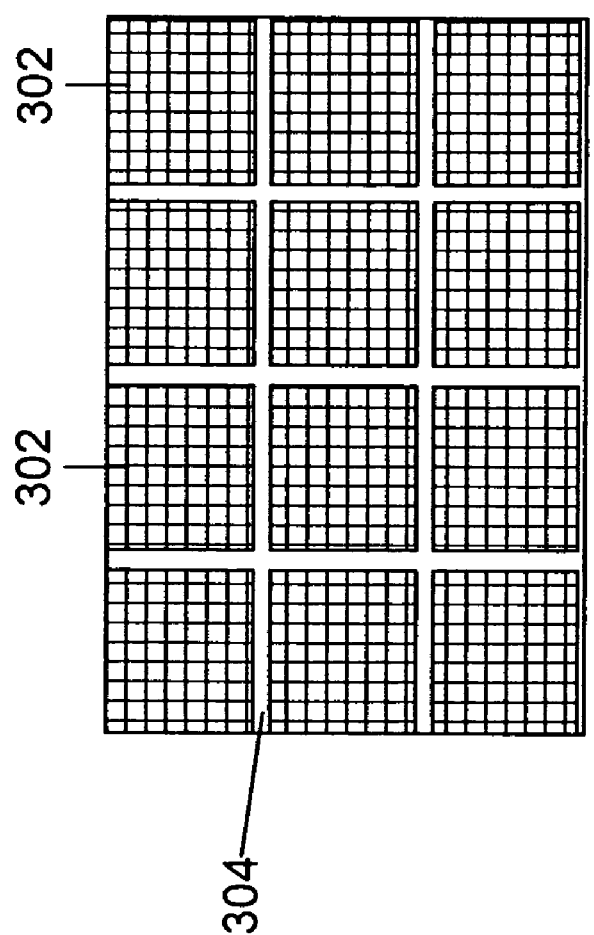
FIG. 3 illustrates the front-view of an exemplary housing having metal islands with rectangular cross-sections in accordance with the present invention.
Figure 4:
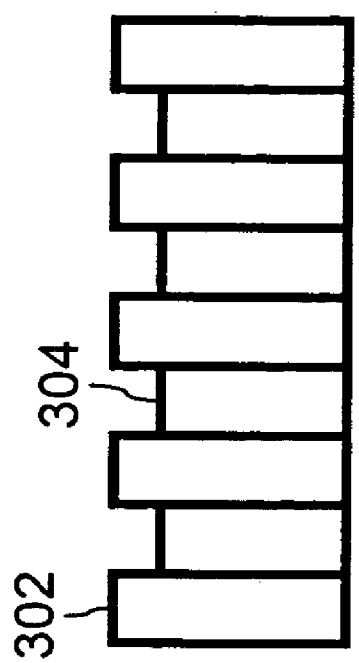
FIG. 4 illustrates the top-view of an exemplary housing having metal islands with square cross sections in accordance with the present invention.

Referring to FIGS. 3 and 4, there are shown the front-view and the top-view of the housing 110 having metal islands 302 with rectangular cross section, in accordance with the present invention. The metal islands 302 of the housing 110 have a rectangular lattice structure and are square in shape. The length of the side of the square is in the range of one millimeter (mm) to ten mm. For one embodiment, the length of the side of the square is ten mm. For another embodiment, the length of the side of the square is five mm. Metal islands 302 are separated from each other by gaps, hereinafter referred to as gap 304. The width of the gap 304 is in the range of zero mm to one mm. For one embodiment, the width of the gap 304 is one mm. For another embodiment, the width of the gap 304 is 0.5 mm. The gaps 304 reduce interference in the transmission of signals by the antenna 202.

Figure 5:
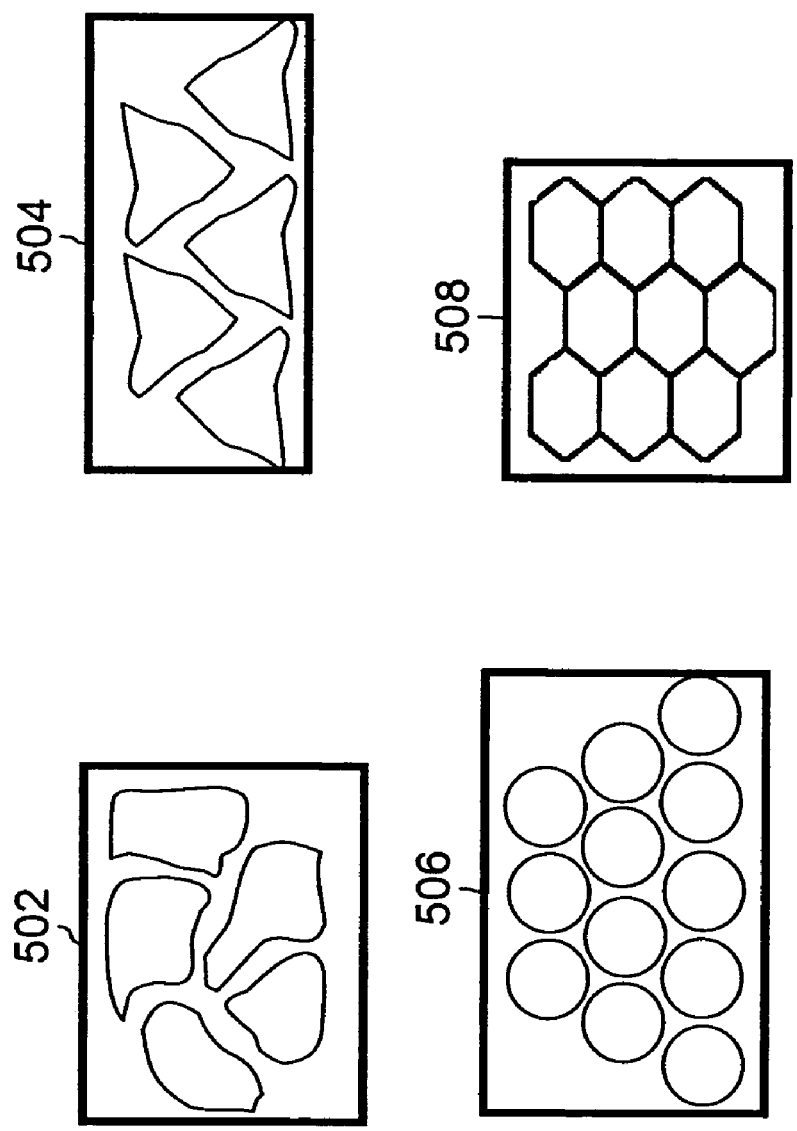
FIG. 5 illustrates four types of cross-sections of metal islands in accordance with the present invention.

Referring to FIG. 5, there are shown four types of cross-sections of metal islands, in accordance with the present invention. For one embodiment, a housing 502 of the antenna 202 has non-uniform metal islands. Hence, the width of the gaps between the metal islands is also non-uniform. For another embodiment, a housing 504 of the antenna 202 has metal islands with a triangular lattice structure. The length of the side of the triangle is in the range of one millimeter (mm) to 30 mm. For another embodiment, a housing 506 the antenna 202 has metal islands with a circular lattice structure. The diameter of the circle is the range of one mm to 50 mm. For another embodiment, a housing 508 the antenna 202 has metal islands with a honeycomb structure, i.e., each metal island has a hexagonal cross-section.

Figure 6:
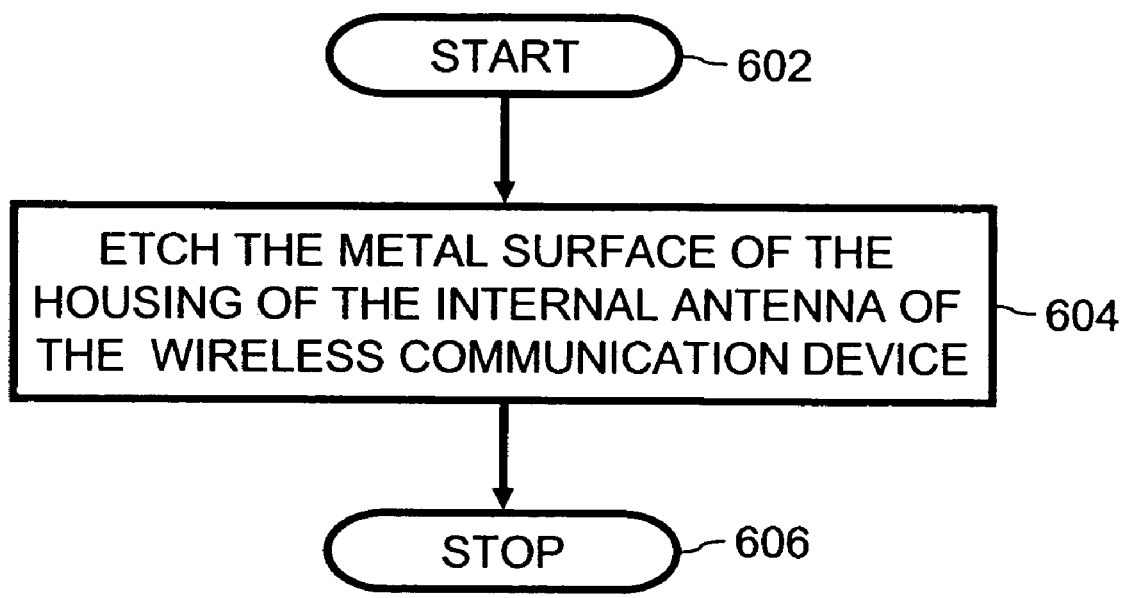
FIG. 6 is a flow diagram illustrating the steps involved in reducing the interference in a wireless communication device having a metal housing in accordance with the present invention.

Referring to FIG. 6, there is shown a flow diagram 600 that illustrates an exemplary process of reducing the interference in a wireless communication device 100 having back housing 102, in accordance with the invention. After initiating the process at step 602, at step 604, the metal surface of the back housing 102 is etched. The back housing 102 is made up of an electromagnetically transparent decorative metal (ETDM). For one embodiment, the etching is done with a laser device. For another embodiment, the etching is done with mechanical means. For example, it is done with a numerically controlled milling machine. For another embodiment, the etching is done with chemicals, such as ferric chloride, hydrochloric acid, or nitric acid. The etching creates metal islands on the surface of the back housing 102. The metal islands are separated from each other by gaps. These gaps between the metal islands reduce the interference in the transmission of signals caused by the metal surface of the back housing 102. Further, the ETDM allows the electromagnetic energy to pass through the back housing 102 with minimum attenuation. Thereafter the process terminates at step 606.

The width of the gaps is varied by controlling the depth of etching. For example, in the case of laser etching, the depth of the etching is controlled by modulating the intensity of the laser beam or by controlling the speed at which the laser beam passes over the metal surface. For one embodiment, the depth of the etching is adjusted to create metal islands that are isolated from each other, but do not have any visible separating lines.

Figure 7:
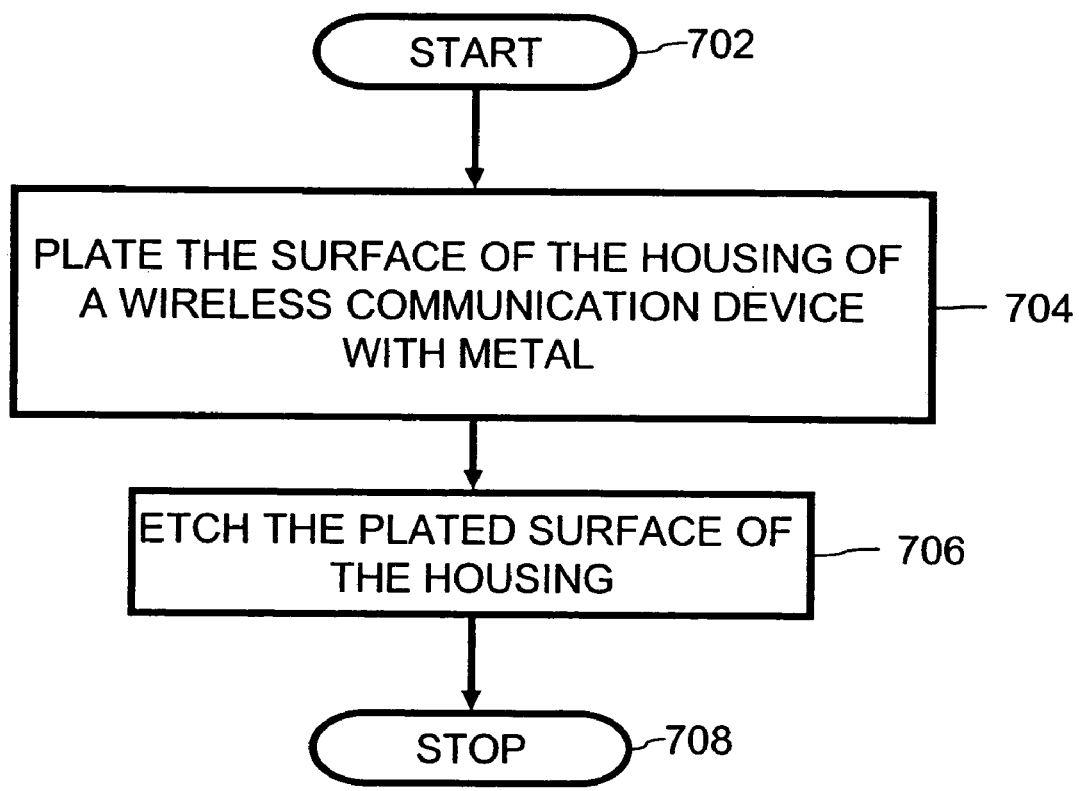
FIG. 7 is a flow diagram illustrating the steps involved in reducing the interference in a wireless communication device having a metal plated housing, in accordance with the present invention.

Referring to FIG. 7, there is shown flow diagram 700 that illustrates an exemplary process of reducing the interference in a wireless communication device 100 having back housing 102, in accordance with the invention. The process is initiated at step 702. For one embodiment, the back housing 102 is made of plastic. At step 704, the exterior surface of the back housing 102 is plated with a metal. For one embodiment, the plating is carried out by the vacuum metallization process. The vacuum metallization process creates a thin metal film on the surface of a sample. In this process, the metal to be deposited on the sample is heated under high vacuum and is then evaporated. This process deposits the metal particles on the surface of the sample. Thereafter, at step 706, the metal plated surface of the back housing 102 is etched to create metal islands on the metal plated surface. For one embodiment, etching is performed with a laser device. The metal islands are separated from each other by gaps. The gaps allow the electromagnetic signals transmitted by the antenna 202 to pass through. Further, the electromagnetically transparent metal allows the electromagnetic energy to pass through the back housing 102 with minimum attenuation. For another embodiment, metal pieces are glued to the back housing 102 of the wireless communication device 100 to create metal islands. This process is used especially when large metal islands are required. Thereafter, the process is terminated, at step 708.

For one embodiment, some of the metal islands are connected to each other to form a bridge, i.e., a circuit is formed that is connected to the main printed circuit board of the wireless communication device 100. This bridge helps to detect proximity of objects to the wireless communication device 100. For one embodiment, the bridge of the metal islands forms a capacitive or inductive sensor. The proximity of metallic objects is detected if there is a change in the inductance of the bridged islands. The proximity of non-metallic objects is detected if there is a change in the capacitance of the bridged islands. For one embodiment, the bridge is connected to the printed circuit board of the wireless communication device 100 using pogo pins or springs For an embodiment, the ETDM surface of the back housing 102, i.e., the housing 110 allows the light to pass through it. Hence, light annunciation is shown through the back housing 102 without making any specific aperture in the wireless communication device 100. The velocity of light passing through an ETDM is less than that of light passing through free space. As a result, the light generated by a light source, such as a Light Emitting Diode (LED), placed inside the wireless communication device 100, undergoes partial reflection. Furthermore, when the intensity of the reflected internal light is lower than that of the external reflected light from the housing 110, a mirror surface is perceived. However, if the intensity of the transmitted light is more than that of the reflected light from the housing 110, the internal light is perceived.

For one embodiment, a logo is embedded in the metal islands. The logo is visible when the light source is activated, and can be created by bridging the metal islands in the shape of the logo. The logo may also be created by changing the shapes of individual metal islands, to form a pattern conforming to the logo.

Referring to FIG. 8, there is shown a table illustrating the difference between the free space total radiated power (FTRP) by a mobile phone with a non-metallic housing and a mobile phone with an ETDM housing, in accordance with the present invention. The FTRP represents the total power radiated by an antenna (in decibels (dB)) in all directions. The FTRP by the mobile phone is calculated for different channels of frequencies. Channels (Ch) 128, 189, and 251 represent a first band of frequency and channels 512, 661, and 810 represent a second band of frequency. The table indicates that in the first frequency band, the average difference between the FTRP by the mobile phone with a non-metallic housing and the mobile phone with an ETDM housing is 0.8 dBm. In the second frequency band, the average difference between the FTRP by the mobile phone having a non-metallic housing and the mobile phone having an ETDM housing is −0.7 dBm. Therefore, the ETDM housing in mobile phones does not alter the FTRP, when compared to mobile phones with non-metallic housing.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An internal antenna system of a wireless communication device, the wireless communication device including a housing having a front housing and a back housing, wherein a display and a keypad are located on the front housing of the wireless communication device, the internal antenna system comprising:
    an antenna capable of transmitting and receiving radio frequency energy; and
    an antenna housing covering the antenna and located in at least an upper part of the back housing of the wireless communication device, the antenna housing made up of an electromagnetically transparent decorative metal (ETDM), the antenna housing having a plurality of metal islands, wherein the plurality of metal islands are separated from each other by particular distances to allow the radio frequency energy of the antenna to pass through the antenna housing with minimal attenuation.

2. The internal antenna system of claim 1, wherein the particular distances are a value that is greater than zero mm and less than about one mm.

3. The internal antenna system of claim 1, wherein the plurality of metal islands have sizes that are non-uniform.

4. The internal antenna system of claim 1, wherein the plurality of metal islands form at least one of a rectangular lattice structure and a circular lattice structure.

5. The internal antenna system of claim 4, wherein the plurality of metal islands have square cross-sections.

6. The internal antenna system of claim 5, wherein a length of a side of each square cross-section is about one millimeter (mm) to about ten mm.

7. The internal antenna system of claim 1, wherein the antenna is a multi-band antenna.

8. The internal antenna system of claim 1, wherein the antenna housing is permeable to light.

9. A wireless communication device comprising:
    a housing having a front housing and a back housing, wherein a display and a keypad are located on the front housing of the wireless communication device;
    an internal antenna capable of transmitting and receiving radio frequency energy; and
    an antenna housing covering the internal antenna and located in at least an upper part of the back housing of the wireless communication device, the antenna housing made up of an electromagnetically transparent decorative metal (ETDM), the antenna housing having a plurality of metal islands, wherein the plurality of metal islands are separated from each other by gaps to allow the radio frequency energy of the internal antenna to pass through the antenna housing with minimal attenuation.

* * * * *